M. E. PETERSON.
FOCUSING ATTACHMENT FOR CAMERAS.
APPLICATION FILED MAR. 29, 1917.
1,251,690.
Patented Jan. 1, 1918.
2 SHEETS—SHEET 1.
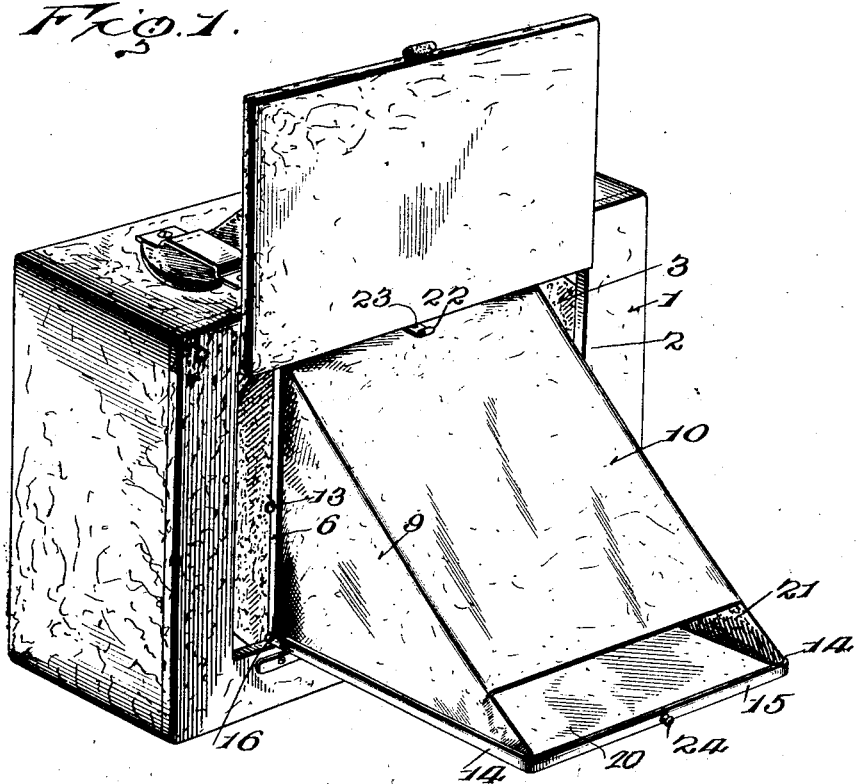
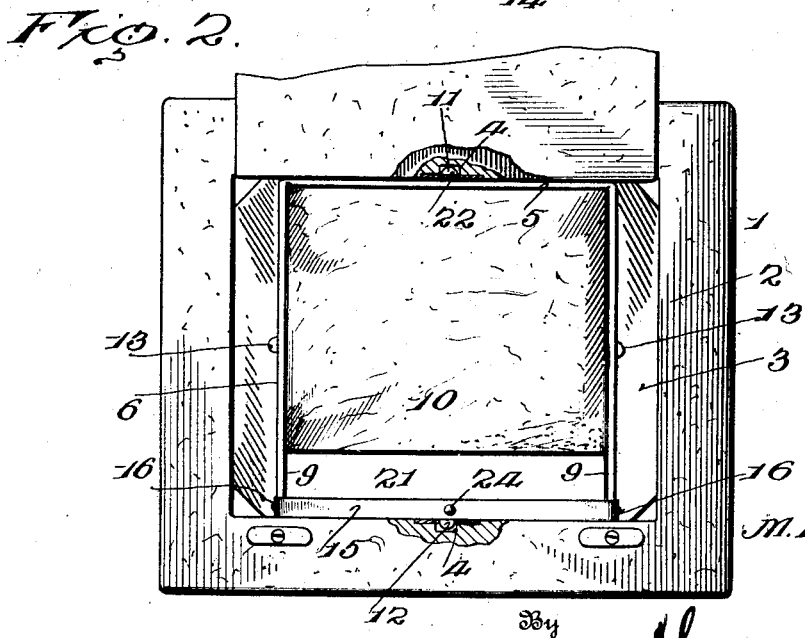

M. E. PETERSON.
FOCUSING ATTACHMENT FOR CAMERAS.
APPLICATION FILED MAR. 29, 1917.
1,251,690.
Patented Jan. 1, 1918.
2 SHEETS—SHEET 2.
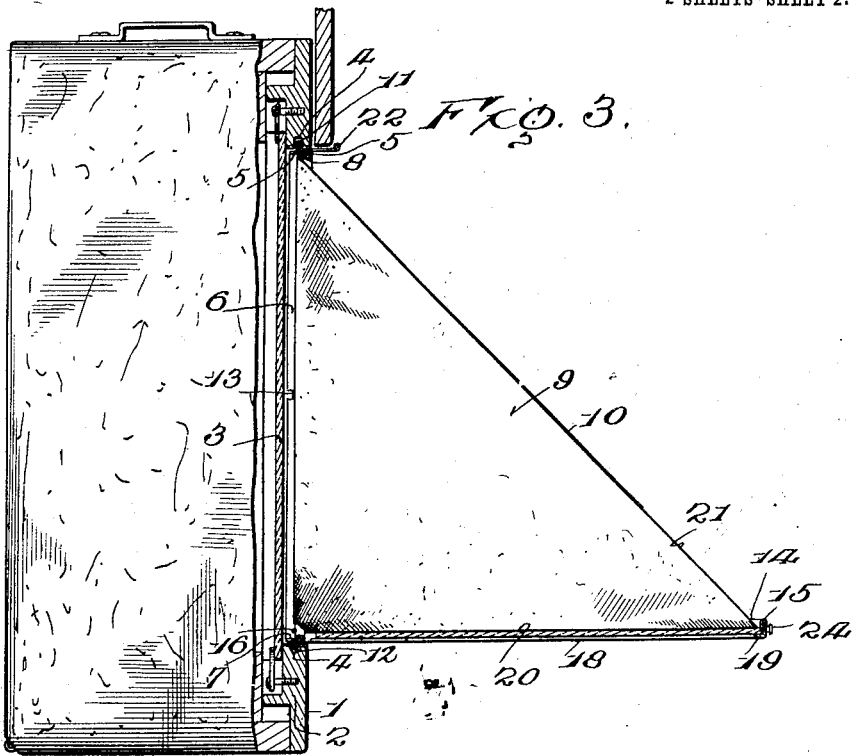
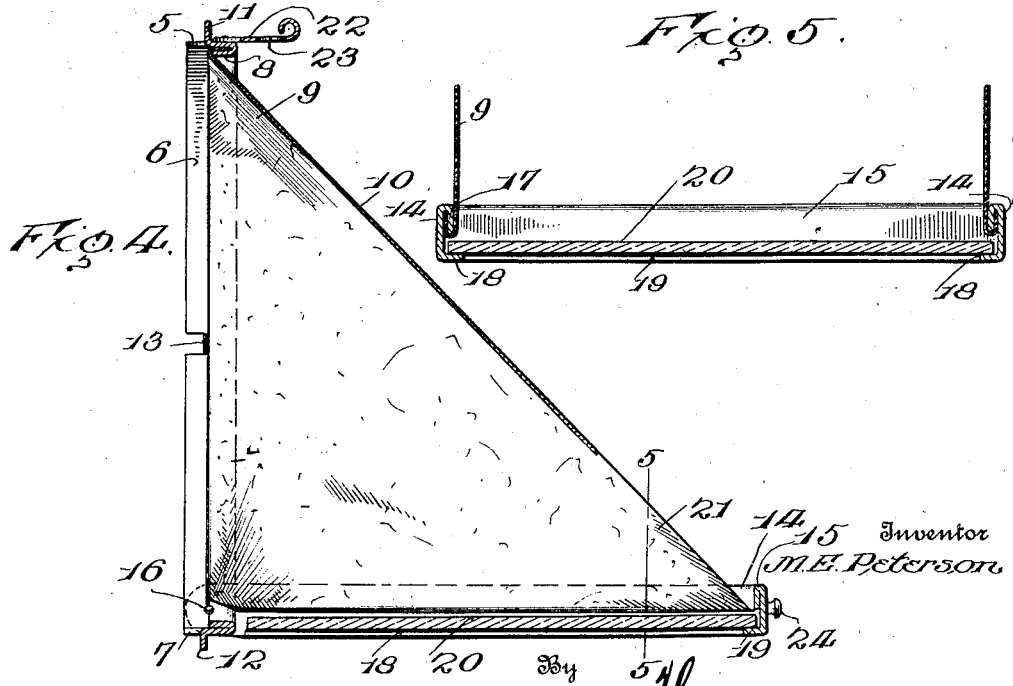
Inventor
M. E. Peterson
By
Attorneys.

UNITED STATES PATENT OFFICE.

MILES E. PETERSON, OF PEMETA, OKLAHOMA.

FOCUSING ATTACHMENT FOR CAMERAS.

1,251,690.

Specification of Letters Patent.

Patented Jan. 1, 1918.

Application filed March 29, 1917. Serial No. 158,314.

*To all whom it may concern:*

Be it known that I, MILES E. PETERSON, a citizen of the United States, residing at Pemeta, in the county of Creek and State of Oklahoma, have invented certain new and useful Improvements in Focusing Attachments for Cameras, of which the following is a specification.

This invention relates to focusing attachments for cameras and has as its object to provide a focusing attachment which when not in use may be folded to occupy but little space and which may be readily applied to and removed from the camera back and will enable the user to focus the camera without resorting to the use of the usual focusing cloth.

The invention also aims to provide a focusing attachment for cameras which attachment will enable the user to view the image in upright position.

Another aim of the invention is to provide a focusing attachment as above described which may be applied to the camera back and employed when making either horizontal or perpendicular exposures.

In the accompanying drawings:

Figure 1 is a perspective view of the attachment applied to a camera back;

Fig. 2 is a rear elevation of the device, portions of the camera back being broken away to illustrate the manner in which the attachment is held in place;

Fig. 3 is a vertical front to rear sectional view through the attachment and the camera back;

Fig. 4 is a similar view in detail, the attachment being removed from the camera back;

Fig. 5 is a vertical transverse sectional view on the line 5—5 of Fig. 4.

In the drawings, the numeral 1 indicates in general a camera back including the usual frame 2 in which is arranged the ground glass 3 upon which the image is projected in inverted position in the ordinary manner of focusing. For a purpose to be presently explained the upper and lower members of the frame 2 are formed or provided with sockets 4 located in vertical alinement and mid-way between the ends of the frame.

The attachment embodying the present invention includes two hingedly connected frames, one of which frames is designed to be disposed within the frame 2 in the manner shown in Figs. 1, 2 and 3 of the drawings and the other said frame supports a mirror in which is reflected the image upon the ground glass. The first-mentioned frame includes a top 5 and sides 6, and a bottom 7, the frame being rectangular and being preferably formed from resilient sheet metal. Each of the members 5, 6 and 7 is provided with a flange 8 which is folded in toward the inner side of the respective member and the flanges of the members 5 and 6 grip the forward margins of the sides 9 and top 10 of a hood which is preferably of black cloth. In order that this frame may be disposed and held within the frame 2, the top and bottom members 5 and 7 are respectively formed with upstanding and depending fingers 11 and 12 which are designed for engagement in the sockets 4 in the upper and lower members of the frame 2. This engagement of the fingers 11 and 12 in the sockets 4 is obtained by slightly springing inwardly the intermediate portions of the top and bottom members 5 and 7, the resiliency of the members, when they are relieved of pressure, serving to project the fingers into the said sockets. In order that the frame just described may be arranged within the frame 2 in a position at right angles to the position shown in Figs. 1 and 3 of the drawings, the side members 6 of the said frame are provided with fingers 13 corresponding to the fingers 11 and 12.

The other frame of the attachment includes side members 14 and a connecting member 15 and the members 14 are pivotally connected, as at 16, at their ends to the outer sides of the side members 6 of the first described frame so that the last described frame may be swung down to assume the position shown in the several figures of the drawings while the attachment is being employed in focusing or the second-mentioned frame may be swung up to position against the first-mentioned frame when the attachment is not in use. The side members 14 of the mirror frame are provided with flanges 17 which grip the lower marginal portions of the sides 9 of the hood. The side and connecting members 14 and 15 of the said frame are further provided at their lower edges with inwardly projecting flanges 18 and 19, respectively which constitute a rest for the marginal portions of the mirror which is indicated by the numeral 20. As will be observed by reference to Figs. 1, 3 and 4 of the drawings, the top 10 of the hood extends from the top 5 of the first-described frame downwardly at an angle above the mirror 20 but terminates at its lower end short of the member 15 of the mirror frame so that a sight opening 21 is left in the lower portion of the top 10 through which the reflected image in the mirror may be viewed. It will now be understood that when the attachment is applied to the camera, as shown in Figs. 1, 2 and 3 of the drawings, the image upon the ground glass will be reflected in the mirror and may be viewed through the opening 21 and thus the photographer is enabled to focus the camera without having to employ the usual focusing cloth or other means for excluding light from the vicinity of the ground glass. When the attachment is not in use it may be folded to compact form and conveniently carried. In order that the attachment may be held folded the top 5 of the first described frame is provided with a spring latch finger 22 having an opening 23 and the member 15 of the mirror frame is provided with a stud 24 designed to engage in the said opening 23 when the frames are folded.

Having thus described the invention, what is claimed as new is:

1. In a focusing attachment for cameras, an open attaching frame, a second frame hingedly connected with the lower side of the first-mentioned frame, the second-mentioned frame being adapted to be swung to position substantially perpendicular to the plane of the first-mentioned frame, a mirror supported within the second-mentioned frame, and a hood of flexible material including sides and a connecting wall secured to and extending between the said frames, the connecting wall of the hood having an opening in its portion next adjacent the second-mentioned frame.

2. In an attachment of the class described, an attaching frame having resilient sides, attaching fingers carried by the said sides and designed to engage the spaced members of a support and to be brought into and out of such engagement by inward springing of the said sides of the frame, a second frame disposed at an angle to the first-mentioned frame, a mirror mounted in the second-mentioned frame, and a hood extending between the frames.

In testimony whereof I affix my signature.

MILES E. PETERSON. [L. S.]

Copies of this patent may be obtained for five cents each, by addressing the "Commissioner of Patents, Washington, D. C."